United States Patent
Ivakitch et al.

(10) Patent No.: US 11,391,208 B2
(45) Date of Patent: Jul. 19, 2022

(54) FAN BLADE ANTI-ICING CONCEPT

(71) Applicant: PRATT & WHITNEY CANADA CORP., Longueuil (CA)

(72) Inventors: Richard Ivakitch, Scarborough (CA); David Menheere, Norval (CA); Paul Stone, Guelph (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/325,278

(22) Filed: May 20, 2021

(65) Prior Publication Data
US 2021/0277826 A1 Sep. 9, 2021

Related U.S. Application Data

(62) Division of application No. 16/683,552, filed on Nov. 14, 2019, now Pat. No. 11,073,082.

(60) Provisional application No. 62/925,848, filed on Oct. 25, 2019.

(51) Int. Cl.
*F02C 7/047* (2006.01)

(52) U.S. Cl.
CPC .................................. *F02C 7/047* (2013.01)

(58) Field of Classification Search
CPC . F02C 7/047; F02C 6/08; B64D 15/04; F04D 29/324; F04D 29/584; B64C 11/205; F05D 2220/36; F05D 2240/305; F05D 2240/306; F05D 2250/322; Y02T 50/60; F01D 5/18; F01D 25/02; F01D 5/08
See application file for complete search history.

(56) References Cited

U.S. PATENT DOCUMENTS

| 2,556,736 | A | 6/1951 | Palmatier |
| 9,387,923 | B2 | 7/2016 | Stretton et al. |
| 9,828,914 | B2 | 11/2017 | Suciu et al. |
| 2008/0014095 | A1 | 1/2008 | Moniz et al. |
| 2012/0107133 | A1 | 5/2012 | Bulin et al. |
| 2015/0345327 | A1* | 12/2015 | Huang .................... F01D 25/12 |
| | | | 415/115 |

(Continued)

FOREIGN PATENT DOCUMENTS

| CN | 106703997 | 8/2018 |
| CN | 108591123 | 9/2018 |
| EP | 0788447 B1 | 8/1997 |

(Continued)

*Primary Examiner* — Jacob M Amick
*Assistant Examiner* — Charles J Brauch
(74) *Attorney, Agent, or Firm* — Norton Rose Fulbright US LLP

(57) ABSTRACT

A fan blade anti-icing system comprises a fan hub and a fan blade extending radially outwardly from the fan hub. The fan blade has a base and an airfoil extending radially outwardly from the fan base. The airfoil having a leading edge, a trailing edge, a convex side surface between the leading and trailing edge and a concave side surface between the leading and trailing edge. The fan blade further has a radial passage extending from a blade air inlet in the blade base in communication with a source of heated air, and a rearwardly directed passage in communication with the radial passage and having a blade air outlet forward of the trailing edge and oriented tangentially to the convex side surface or concave side surface of the airfoil.

10 Claims, 9 Drawing Sheets

(56) References Cited

U.S. PATENT DOCUMENTS

2018/0087456 A1  3/2018  Alecu et al.

FOREIGN PATENT DOCUMENTS

| EP | 1878872 A2 | 1/2008 |
|----|------------|--------|
| EP | 3088685 A1 | 11/2016 |
| EP | 3282099 A1 | 2/2018 |
| EP | 3438411 A1 | 2/2019 |
| EP | 3441565 A1 | 2/2019 |
| EP | 3450686 A1 | 3/2019 |
| FR | 971304 | 1/1951 |
| FR | 2980537 | 3/2013 |
| GB | 504737 | 5/1939 |

\* cited by examiner

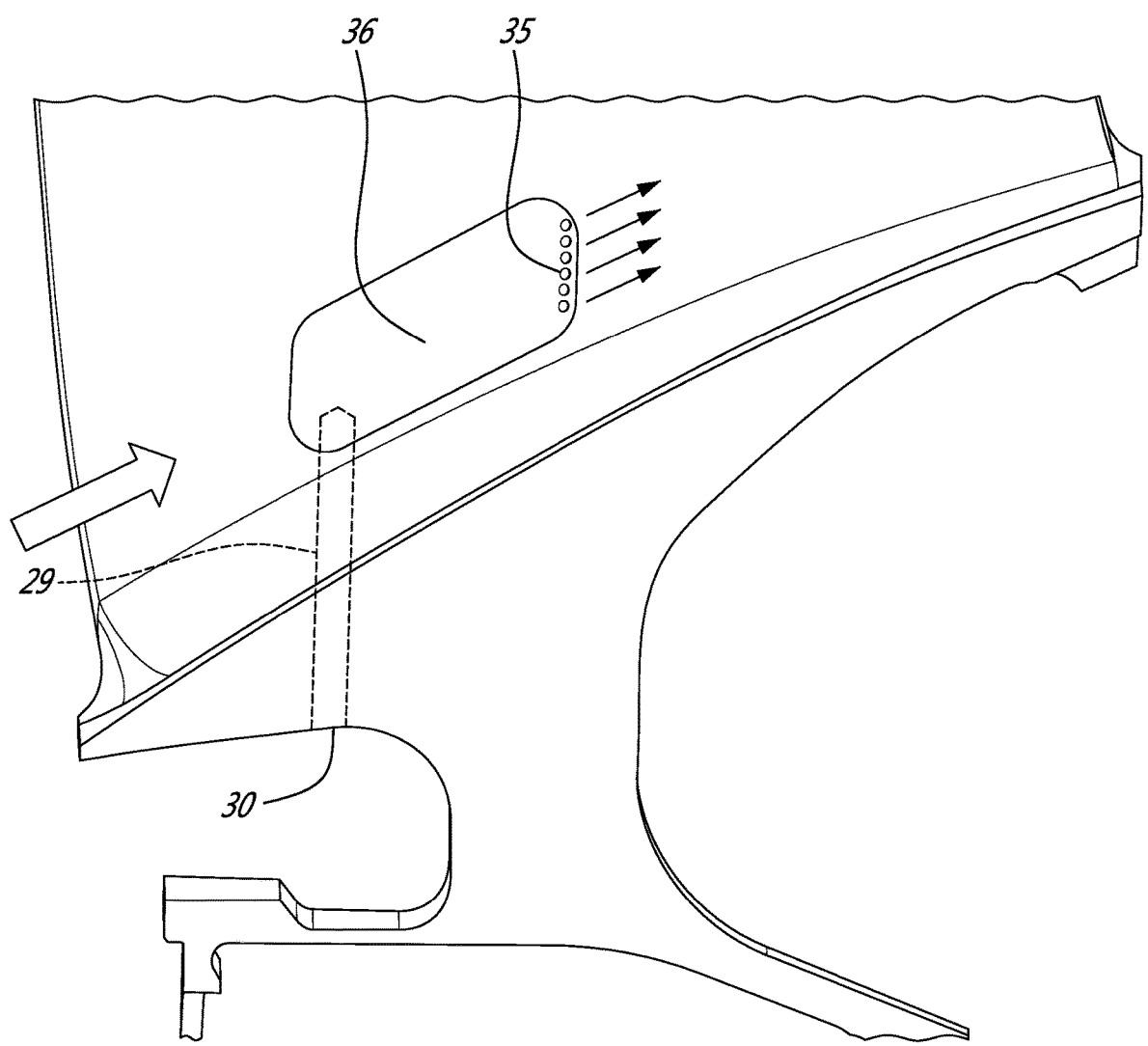

FAN BLADE ANTI-ICING CONCEPT

CROSS-REFERENCE TO RELATED APPLICATIONS

This application is a divisional of U.S. application Ser. No. 16/683,552 filed Nov. 14, 2019, which claims priority to U.S. provisional patent application No. 62/925,848 filed Oct. 25, 2019, the entire contents of which are incorporated by reference herein.

TECHNICAL FIELD

The disclosure relates generally to anti-icing of fan blades in a gas turbine engine.

BACKGROUND

Ice can form and adhere to the fan blades of a gas turbine engine under certain conditions during flight. The weight of the ice buildup can result in imbalance of the fan and can be detrimental to efficient air flow. When ice breaks away and is released, the fan can be imbalanced, orbiting increases, vibration occurs and impact from ice particles can cause foreign object damage.

SUMMARY

The disclosure describes a fan blade anti-icing system for a gas turbine engine comprising: a fan hub mounted for rotation about an axis; and a fan blade extending radially outwardly from the fan hub, the fan blade having a base and an airfoil extending radially outwardly from the fan base, the airfoil having a leading edge, a trailing edge, a convex side surface between the leading and trailing edge and a concave side surface between the leading and trailing edge, the fan blade further having a radial passage extending from a blade air inlet in the blade base in communication with a source of heated air, and a rearwardly directed passage in communication with the radial passage and having a blade air outlet upstream of the trailing edge and oriented tangentially to the convex side surface or concave side surface of the airfoil.

In accordance with another aspect, there is provided a fan blade for a gas turbine engine comprising: a fan blade having a blade base and an airfoil with a radially outward axis, the airfoil having a leading edge, a trailing edge, a convex side surface between the leading and trailing edge and a concave side surface between the leading and trailing edge, the fan blade further having a radial passage extending from a blade air inlet in the blade base for communication with a source of heated air, a rearwardly directed passage in communication with the radial passage and having a blade air outlet upstream of the trailing edge and oriented tangentially to the convex side surface or the concave side surface of the airfoil.

In accordance with a still further general aspect, there is provided a method of impeding icing on an airfoil surface of a fan blade of an aircraft engine, the method comprising: receiving heated pressurized air inside the fan blade; and directing the heated pressurized air exiting the fan blade to flow in a downstream direction over the airfoil surface of the fan blade.

Further details of these and other aspects of the subject matter of this application will be apparent from the detailed description included below and the drawings.

DESCRIPTION OF THE DRAWINGS

FIG. 9 is a further alternative to FIG. 5 with the multiple outlets in a radial alignment.

DETAILED DESCRIPTION

Figure 1:
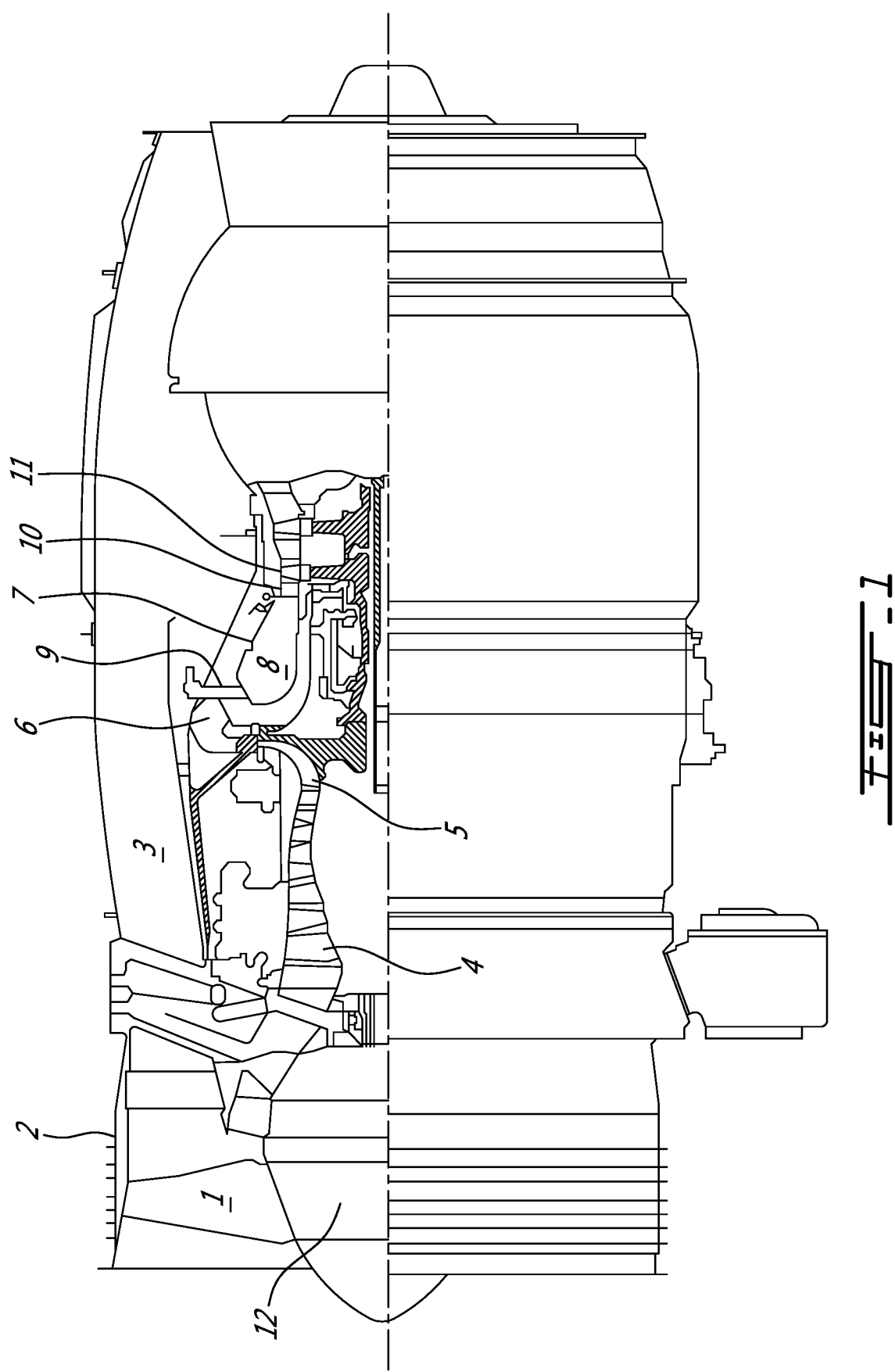
FIG. 1 shows an axial cross-section view of a turbo-fan gas turbine engine.

FIG. 1 shows an axial cross-section through an aircraft engine. According to the illustrated embodiment, the aircraft engine is a turbo-fan gas turbine engine. It is understood that the aircraft engine could adopt various forms others than the illustrated example. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

The present description and drawings relate to anti-icing features of the fan blades 1. The compressors 4, 5 and combustor 8 create pressurized air having a temperature greater than ambient and at least above the freezing temperature of water at flight altitude. Heated pressurized air can be bled from the compressors 4, 5 and combustor 8 and directed through the engine to the fan hub 12 via ducts within the hollow central engine shafts for example.

Figure 2:
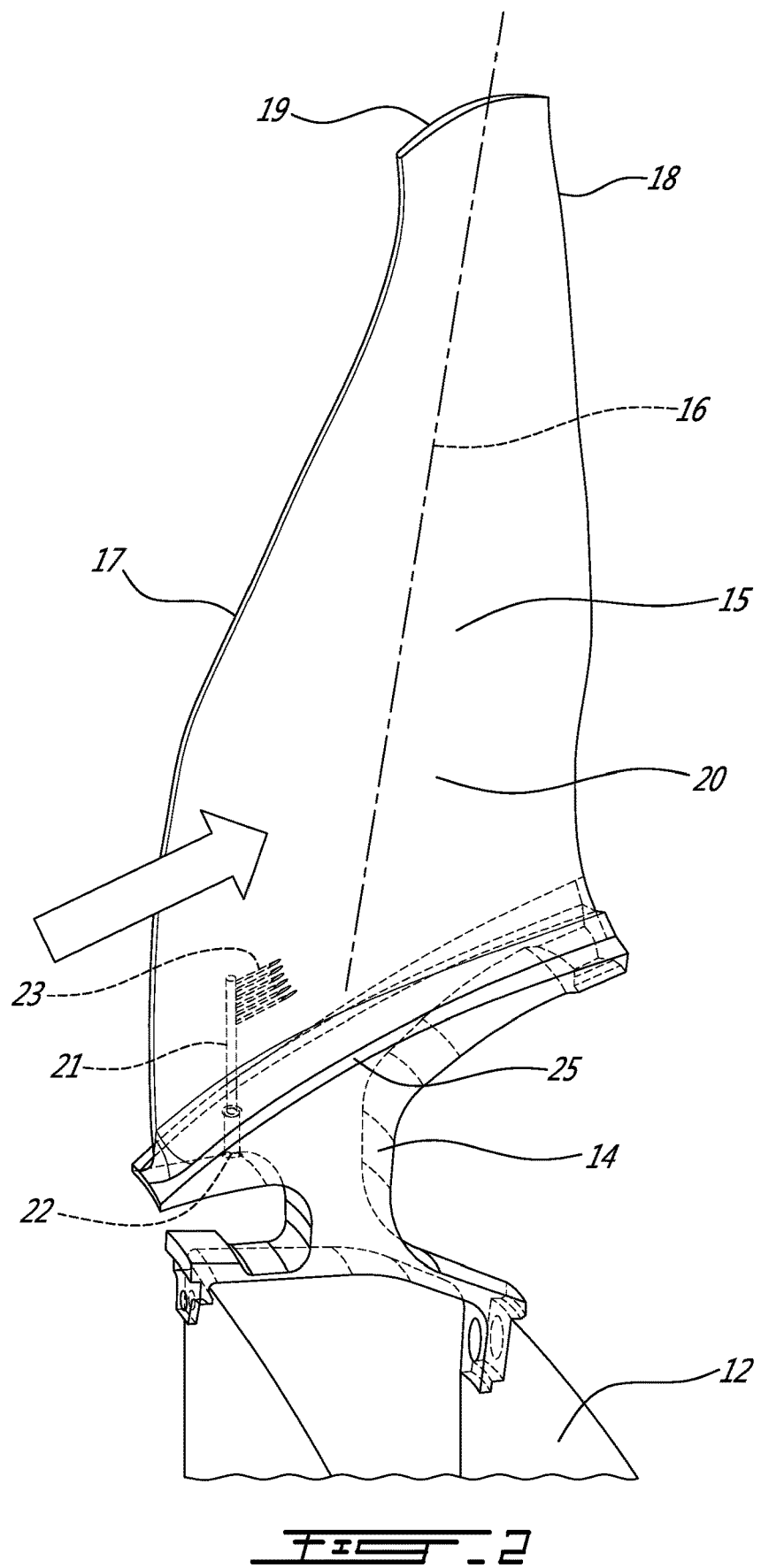
FIG. 2 is an isometric transparent view of a section through an integrally bladed fan rotor in accordance with the present description.
Figure 3:
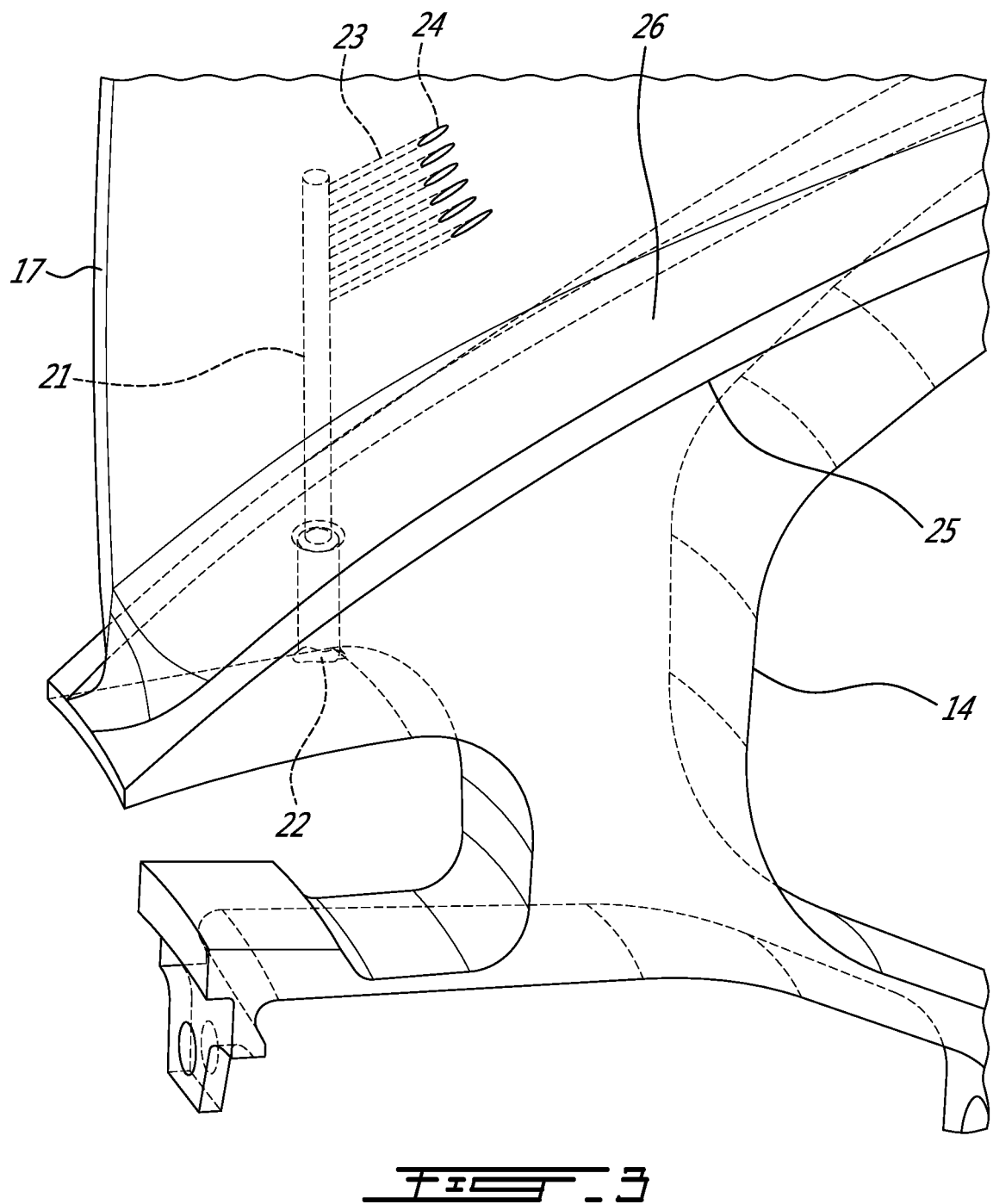
FIG. 3 is an enlarged view of FIG. 2 showing an internal radial passage and multiple rearwardly directed passages with heated air outlets to create a Coanda effect heated air film over the airfoil surface of a fan blade.

With reference to FIGS. 2 and 3, there is shown an integrally bladed fan rotor having a fan hub 12 with a hub air inlet in communication with a source of heated air, such as the compressors 4, 5 and combustor 8. The exemplified fan hub 12 is generally cylindrical or conical with a radially outer surface with multiple blades spaced about the circumference. Each blade has a blade base 14. The fan hub 1 has a plurality of hub air outlets in communication with the hub air inlet to distribute heated pressurized air to each blade.

The fan blade has an airfoil 15 with a radially outward axis 16 generally normal to the direction of air flow into the engine (see arrow). The airfoil 15 has a leading edge 17, a trailing edge 18, a convex side surface 19 between the leading and trailing edge 17, 18 and a concave side surface 20 between the leading and trailing edge 17, 18.

Figure 4:
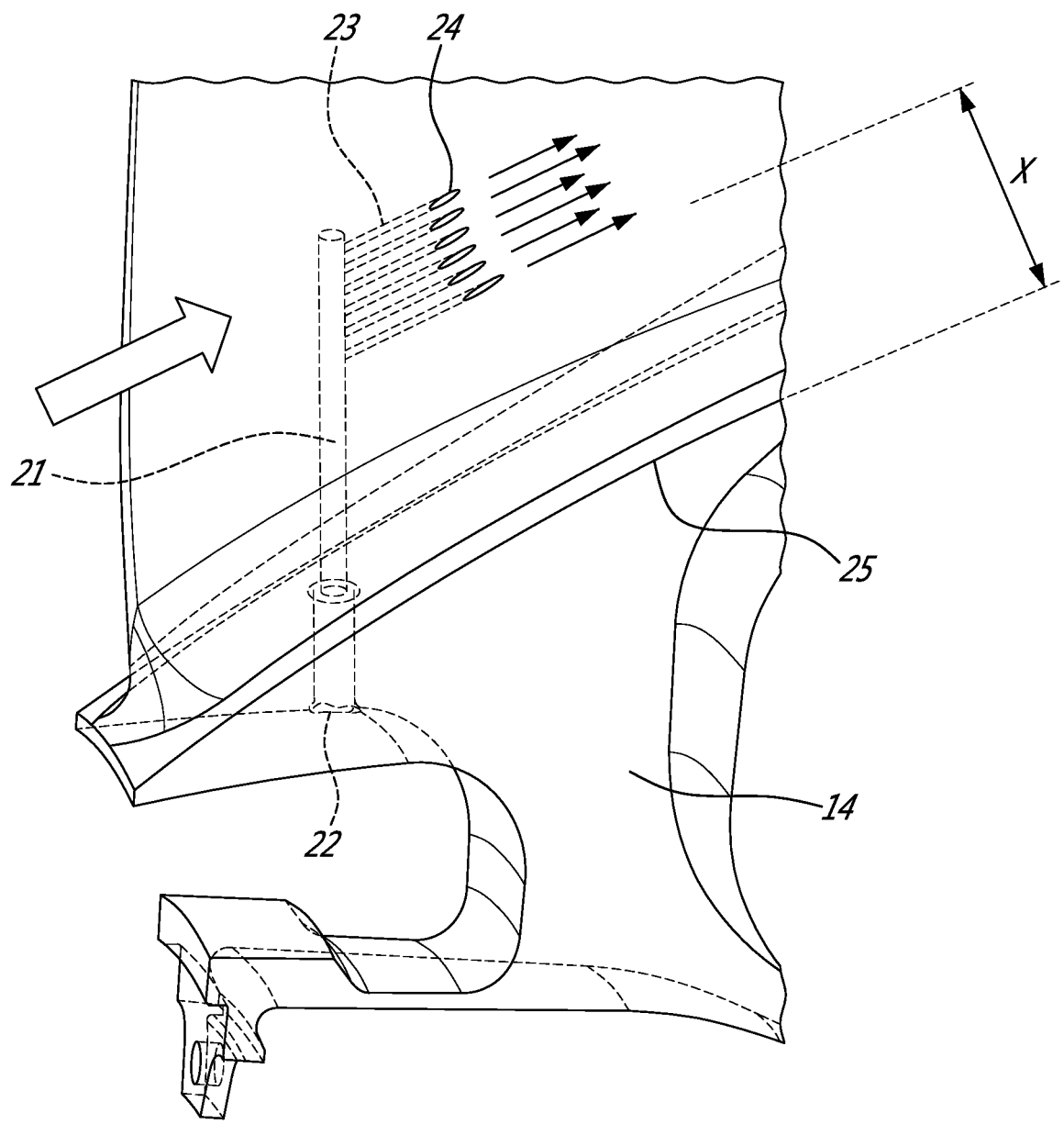
FIG. 4 is a further isometric transparent view of the fan blade as shown in FIG. 3 with a radial passage and having multiple rearwardly directed passages.

As best seen in FIGS. 3 and 4, the blade has a radial passage 21 for receiving and distributing heated pressurized air. The radial passage 21 extends from a blade air inlet 22 in the blade base 14 that is in communication with the air outlet in the fan hub 12. The radial passage 21 is provided adjacent to the leading edge 17. In the example illustrated, six rearwardly directed passages 23 branch off in fluid communication with the radial passage 21. Each passage 23 extends towards the trailing edge 18 and terminates in a blade air outlet 24 in the concave side surface 20, the convex side surface 20 or both.

The blade air outlets 24 are disposed upstream of the trailing edge 18 typically within the upstream half of the airfoil and oriented predominantly tangential to the airfoil surface to emit heated pressurized air substantially parallel to the incoming air that passes over the airfoil 15. The rearward passages 23 and blade air outlets 24 are oriented in a rearward or downstream direction substantially parallel to the incoming air direction to provide for the formation of a heated air film over the airfoil surface. In the radially inward area of the airfoil 15 adjacent to the blade platform 25 and fillet 26, the incoming air direction is directed to be parallel to the blade platform 25 (see arrow in FIG. 2).

The heated pressurized air from the blade air outlets 24 is ejected in streams or jets that merge smoothly with the incoming air. As a result, the streams of heated air are subjected to the Coanda effect and flow downstream attached to the concave side surface 20. The Coanda effect is the tendency of a fluid jet to stay attached to an adjacent surface, named after Romanian inventor Henri Coanda. The effect is the tendency of a jet of fluid emerging from an orifice to follow an adjacent flat or curved surface and to draw in or entrain fluid from the surroundings so that a region of lower pressure develops. The lower pressure region between the jet and adjacent surface draws the jets towards the adjacent surface to flow parallel to or "attach" to the surface. Eventually the jet and ambient air flow tend to mix downstream due to turbulence and the Coanda effect dissipates.

Therefore, the jet of heated pressurized air from the blade air outlets 24 creates a film of heated air flowing parallel to and closely attached to the airfoil surface. The heated air flowing through the radial passage 21 and the multiple rearward passages 23 will heat the metal of the airfoil 15 through convection. In addition, the rearward orientation of the rearward passages 23 and blade air outlets 24 will emit jets of heated air that will flow close to and parallel to the concave side surface 20, the convex side surface 19 or both resulting from the Coanda effect. The areas of the airfoil surface over which the heated jets of air flow will be locally heated to impede formation of ice and melt ice that has been deposited.

In the illustrated example, the multiple rearwardly directed passages 23 and blade air outlets 24 are radially spaced apart and are radially aligned on an imaginary line that is transverse to the blade platform 25. Various alternative patterns of location the rearwardly directed passages 23 and blade air outlets 24 can be adopted depending on the nature of blade anti-icing required. In the examples illustrated, as seen in FIG. 4 the blade air outlets 24 are disposed in an area of the concave side surface 20 that is an offset by a distance 'x' from the blade platform 25.

Figure 5:
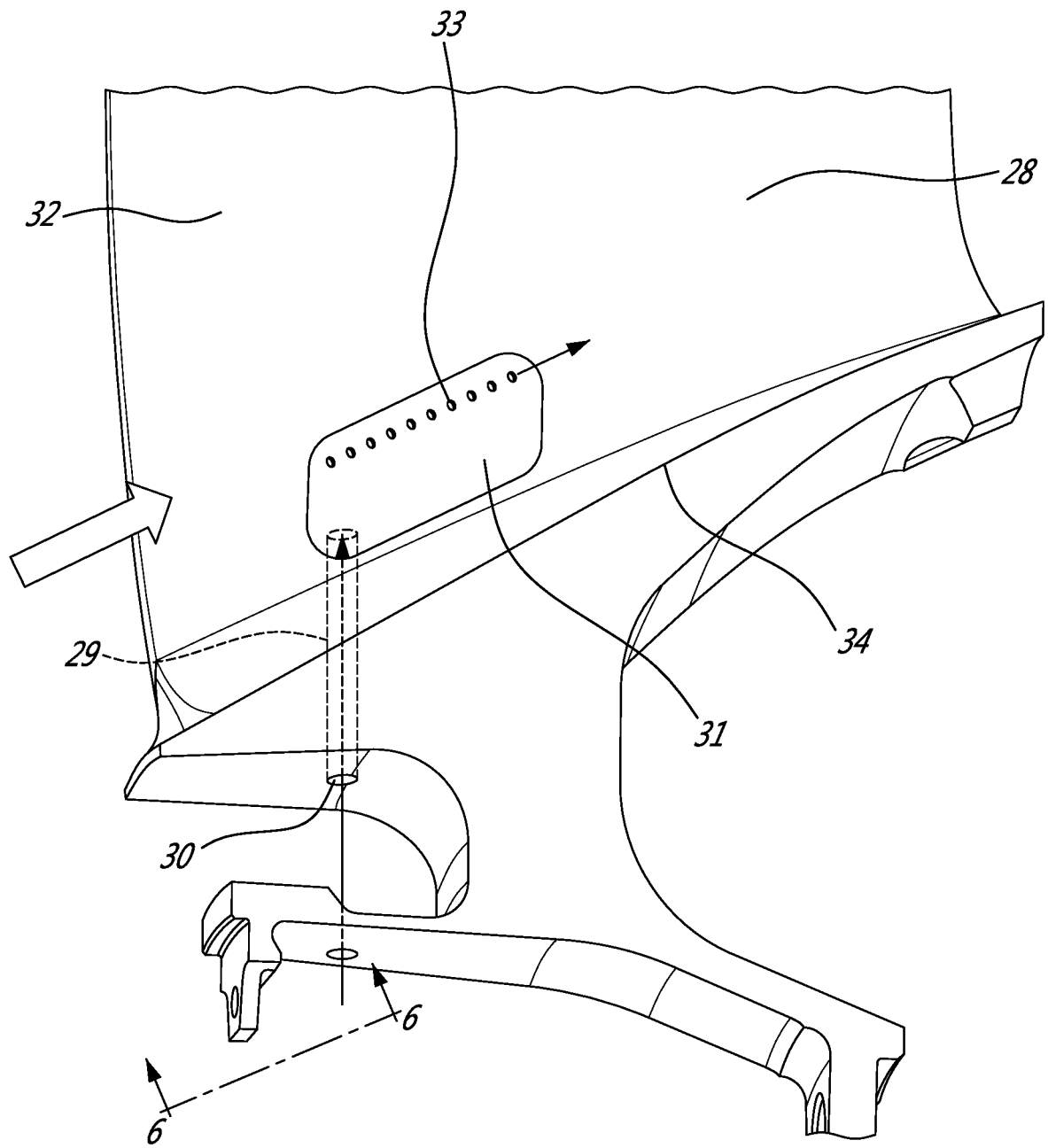
FIG. 5 is an isometric solid view of an alternative fan blade having a recessed pocket and cover defining an air plenum, the cover including multiple outlets to provide for the formation of a film of anti-icing air over a surface of the airfoil.
Figure 6:
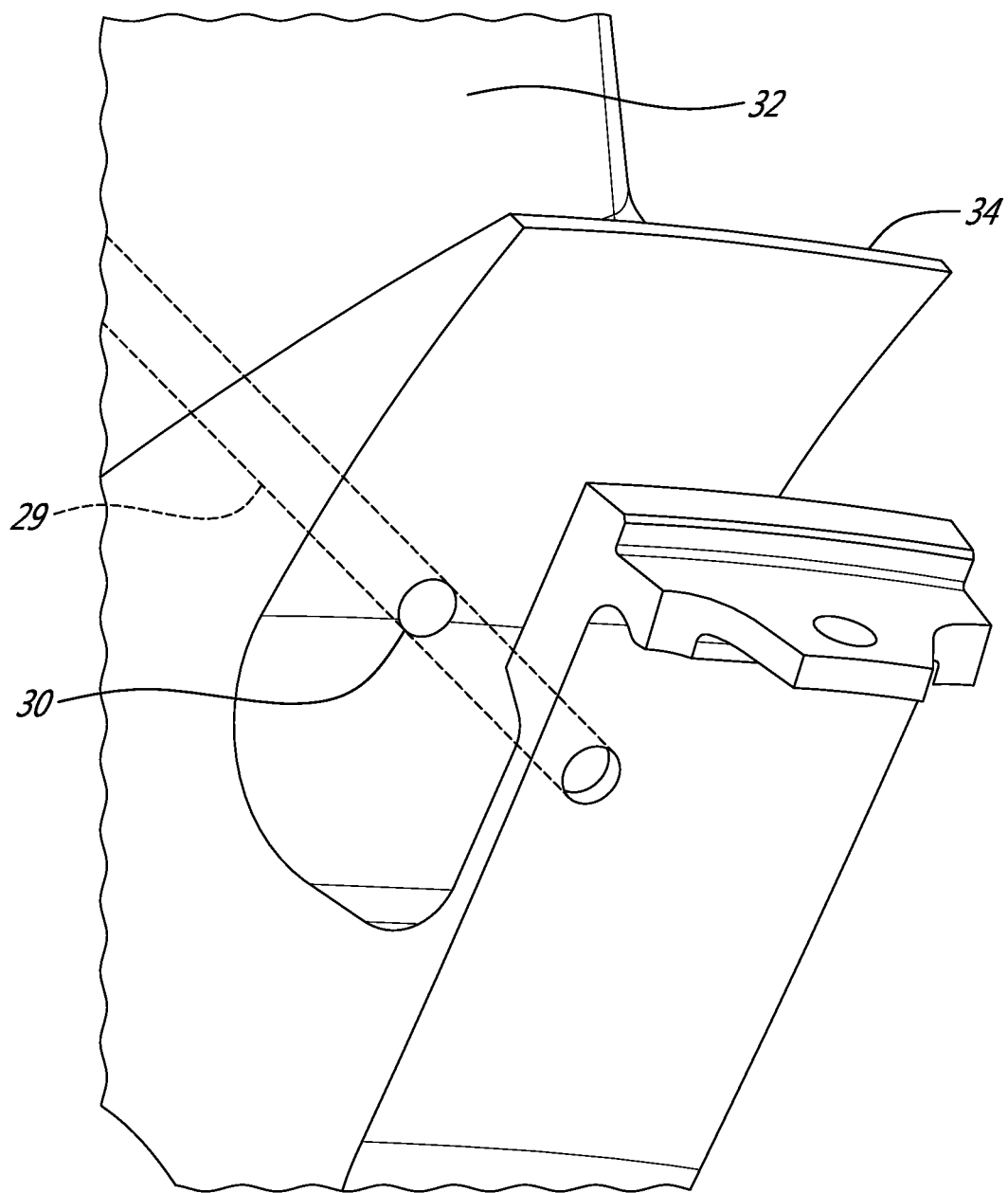
FIG. 6 is an isometric solid view along line 6-6 of FIG. 5 showing the drilled radial passage.
Figure 7:
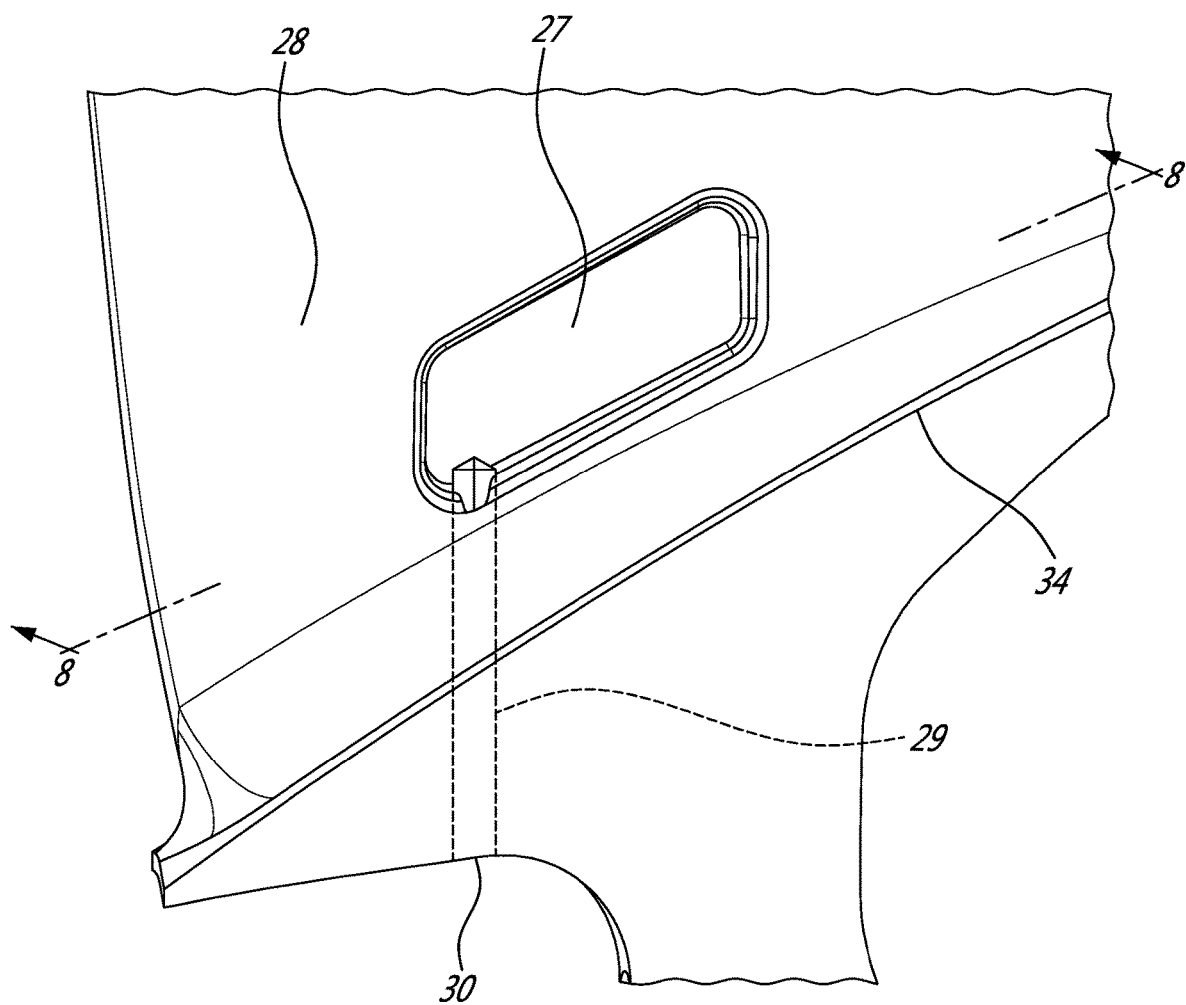
FIG. 7 is a view of the recessed pocket of FIG. 5 with the cover removed.
Figure 8:
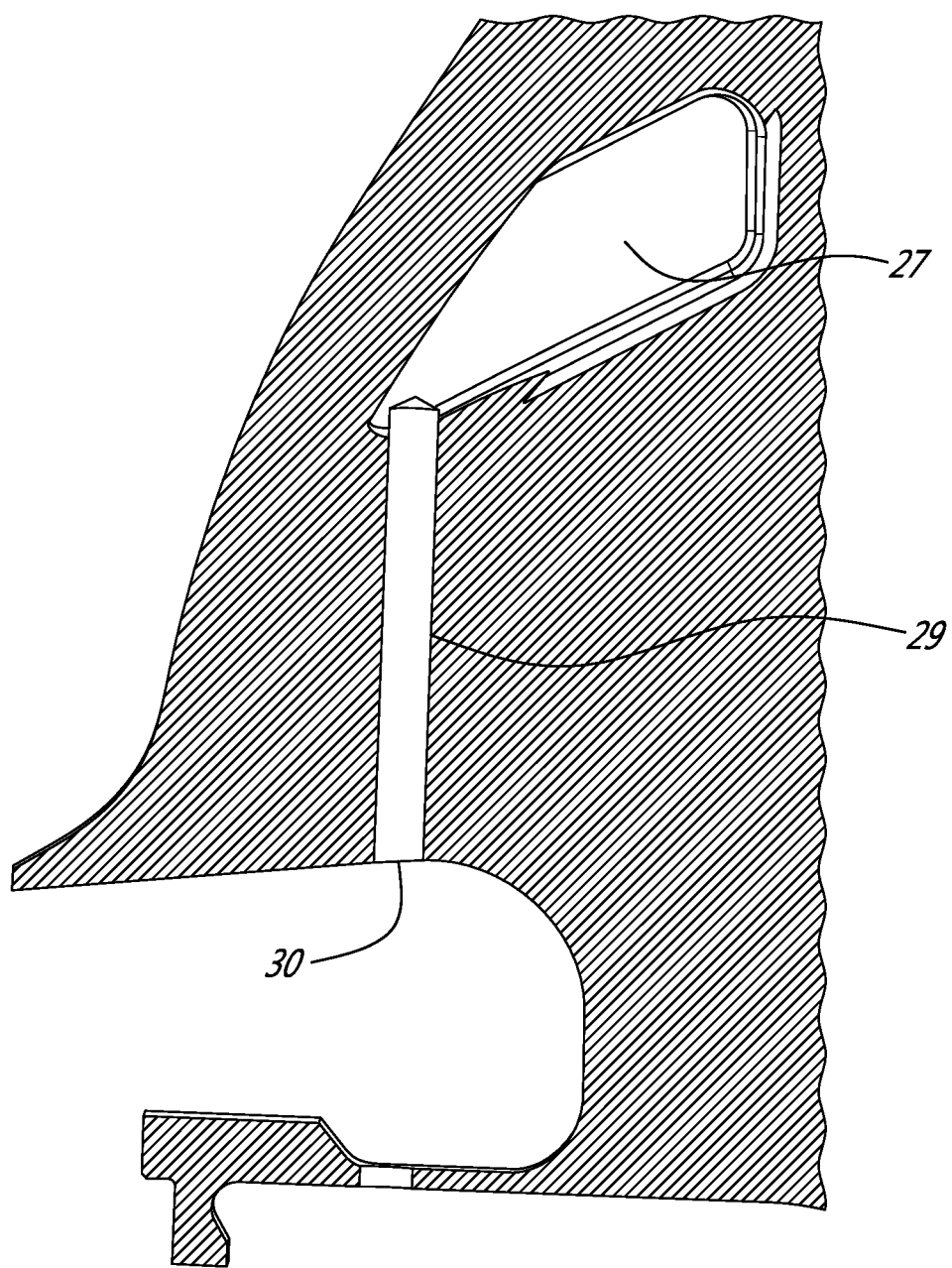
FIG. 8 is a radial section along line 8-8 of FIG. 7 showing the intersection of the radial passage with the recessed pocket.

FIGS. 5 to 9 show an alternative fan blade anti-icing arrangement with a single rearwardly directed passage formed as a recessed pocket 27 (see FIG. 7) in the concave side surface 28. As best seen in FIG. 7, the recessed pocket 27 intersects with and is in fluid communication with the radial passage 29. FIG. 6 shows the blade air inlet 30 and radial passage 29 that have been drilled to connect with the recessed pocket 27.

As seen in FIG. 5, the recessed pocket 27 is covered with a cover 31 to define an internal plenum within the airfoil 32. The plenum between the cover 31 and the recessed pocket 27 receives heated pressurized air from the radial passage 29. The cover 31 and adjacent areas of the airfoil 32 are heated by convection to locally impede icing. Heated air is emitted through the blade air outlets 33 that fluidly communicate with the internal plenum beneath the cover 31. Heated air from the blade air outlets 33 is emitted rearwardly in streams or jets that are substantially parallel to the blade platform 34 and substantially parallel to the rearward incoming air flow direction (see arrow).

FIGS. 5 and 9 show blade air outlets 33 and blade air outlets 35 drilled into the cover 31 and cover 36. The blade air outlets 33, 35 can be drilled through the cover 31 and 36, or may be formed as a slot in an edge of the cover 31, 36 or may be formed as a slot in an edge of the recessed pocket 27. The cover 31, 36 may be sealed to the edges of the recessed pocket 27 by adhesive bonding, welding, or diffusion bonding for example. The corners of the recessed pocket 27 and cover 31 are rounded to reduce stress concentration issues. The cover 31, 36 could be formed as a round disk or other shapes if desired. The shape and location of the recessed pocket 27, and the arrangement of blade air outlets 33, 35 can be selected to target the specific icing experienced by any blade configuration. The above described system can be applied to bladed and integrally bladed fans, both solid and hollow blades, and both metal and composite blades.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method of impeding icing on an airfoil surface of a fan blade of an aircraft engine, the airfoil surface having a concave side surface and a convex side surface opposite to the concave side surface, the method comprising:
   receiving heated pressurized air inside the fan blade;
   ejecting the heated pressurized air adjacent to a leading edge thereof; and
   using a Coanda effect to flow the heated pressurized air over the airfoil surface towards a trailing edge of the fan blade, wherein the heated pressurized air is ejected on both the convex and concave side surfaces.

2. The method of claim 1, wherein the heated pressurized air exiting the fan blade is ejected tangentially to the airfoil surface.

3. The method of claim 1, wherein the heated pressurized air is ejected in a radially inward area of the airfoil surface adjacent to a blade platform of the fan blade.

4. The method of claim 1, wherein the heated pressurized air received inside the fan blade includes air bled from a compressor the aircraft engine.

5. The method of claim 1, wherein the heated pressurized air is ejected in jets tangentially to incoming air flowing over the fan blade, and wherein the jets are spaced-apart along a spanwise direction of the fan blade.

6. A method of mitigating ice accretion on an airfoil surface of a fan blade of an aircraft engine, the airfoil surface having a concave side surface and a convex side surface opposite to the concave side surface, the method comprising:

receiving heated pressurized air inside the fan blade;
   ejecting the heated pressurized air within an upstream half of the airfoil and in a downstream direction predominantly tangential to the airfoil surface and parallel to incoming air that passes over the airfoil surface of the fan blade during engine operation; and
   using the heated pressurized air ejected from the fan blade to create a film of heated air flowing in a downstream direction over the airfoil surface towards a trailing edge of the fan blade, wherein the heated pressurized air is ejected on both the convex and concave side surfaces.

7. The method of claim 6, wherein the heated pressurized air is ejected adjacent to a leading edge of the fan blade.

8. The method of claim 7, wherein the heated pressurized air is ejected in a radially inward area of the airfoil surface adjacent to a blade platform of the fan blade.

9. The method of claim 8, comprising using a Coanda effect to create the film of heated air over the airfoil surface.

10. The method of claim 9, wherein the heated pressurized air is ejected in jets tangentially to the incoming air flowing over the fan blade, and wherein the jets are spaced-apart along a spanwise direction of the fan blade.

\* \* \* \* \*